United States Patent
Nomura (10) Patent No.: US 11,724,713 B2
(45) Date of Patent: Aug. 15, 2023

(54) APPARATUS FOR GENERATING DATA OF TRAVEL PATH INSIDE INTERSECTION, PROGRAM FOR GENERATING DATA OF TRAVEL PATH INSIDE INTERSECTION, AND STORAGE MEDIUM

(71) Applicant: DENSO CORPORATION, Kariya (JP)

(72) Inventor: Tomoo Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 16/895,894

(22) Filed: Jun. 8, 2020

(65) Prior Publication Data

US 2020/0298879 A1    Sep. 24, 2020

Related U.S. Application Data

(63) Continuation of application No. PCT/JP2018/035384, filed on Sep. 25, 2018.

(30) Foreign Application Priority Data

Dec. 11, 2017    (JP) .................................. 2017-236875

(51) Int. Cl.
*B60W 60/00* (2020.01)
*G08G 1/01* (2006.01)

(52) U.S. Cl.
CPC ......... *B60W 60/001* (2020.02); *G08G 1/0133* (2013.01); *G08G 1/0145* (2013.01); *B60W 2555/60* (2020.02)

(58) Field of Classification Search
CPC ............ B60W 60/001; B60W 2555/60; G08G 1/0133; G08G 1/0145
See application file for complete search history.

(56) References Cited

U.S. PATENT DOCUMENTS 8,983,778 B2 *   3/2015   McCarthy ........... G06F 16/2291
                                                                  701/426
2018/0328744 A1   11/2018   Miyake et al.
(Continued)

FOREIGN PATENT DOCUMENTS

JP    2010026326 A    2/2010
JP    2013206008 A    10/2013
(Continued)

OTHER PUBLICATIONS

Jiang Liu, "Generating Enhanced Intersection Maps for Lane Level Vehicle Positioning based Applications", Procedia—Social and Behavioral Sciences 96 ( 2013 ) 2395-2403, available at: https://pdf.sciencedirectassets.com/277811/1-s2.0-S1877042813X00291/1-S2.0-S187704281302394X (Year: 2013).*

(Continued)

*Primary Examiner* — Maceeh Anwari
*Assistant Examiner* — Charles Pall
(74) *Attorney, Agent, or Firm* — Harness, Dickey & Pierce, P.L.C.

(57) ABSTRACT

A travel path data generation apparatus includes an intersection feature data generator that, by using data of travel paths outside intersections, generates intersection feature data representing features of the intersections and a sample data generator that associates the intersection feature data with motion trajectory data showing actual motion trajectories of vehicles inside intersections and generates sample data serving as samples of association between the feature of the intersection and the actual motion trajectories inside the intersection; and a travel path data generator that searches the sample data for the sample that to corresponds to specific intersection feature data representing a feature of a given intersection; specifies the motion trajectory data associated with the specific intersection feature data; and provides the (Continued)

specified motion trajectory data as data of travel paths inside intersections that corresponds to the given intersection.

6 Claims, 10 Drawing Sheets

(56) References Cited

U.S. PATENT DOCUMENTS

| | | | |
|---|---|---|---|
| 2019/0025071 A1 | 1/2019 | Fukui | |
| 2019/0129436 A1* | 5/2019 | Sun | .................. G05D 1/0088 |
| 2020/0250067 A1* | 8/2020 | Walther | .............. G06F 11/3013 |

FOREIGN PATENT DOCUMENTS

| | | | |
|---|---|---|---|
| JP | 2015004514 A | 1/2015 |
| JP | 2015004814 A | 1/2015 |
| JP | 2017091370 A | 5/2017 |
| JP | 2017181870 A | 10/2017 |

OTHER PUBLICATIONS

Jianfeng Zheng and Henry X. Liu, "Automatic Intersection Map Generation, V2I Safety Applications Project Task 10 Report", published Feb. 29, 2016, Report No. FHWA-JPO-16-416, available at: https://rosap.ntl.bts.gov/view/dot/3601/dot_DS1_3601.pdf (Year: 2016).*

Geographical Survey Institute, Ministry of Land, Infrastructure, Transport and Tourism, "Manual for Creating Digital Topographic Map Data Using a Survey", May 2012 with English Translation.

* cited by examiner

R1
ANGLE: 0 DEG
ATTR: PREFECTURAL ROAD
DIST FROM INTXN CENTER: 22m
ROAD WIDTH: 12m

NO. OF ENTER LANES: 2
R1I1 LANE
LATERAL OFFSET: 4m
LANE WIDTH 3.5m
NO. OF CONNECTED LANES: 2
CONNECTED LANES: R201, R301

⋮

R2
ANGLE: 90 DEG
ATTR: NATIONAL ROAD
DIST FROM INTXN CENTER: 22m
ROAD WIDTH: 18m

NO. OF ENTER LANES: 3
R2I1 LANE
LATERAL OFFSET: 7.5m
LANE WIDTH 3.5m
NO. OF CONNECTED LANES: 2
CONNECTED LANES: R301, R401

INTXN FEATURE DATA OF GIVEN INTXN

INPUT INTXN FEATURE DATA TO INFERENCE PROGRAM

GENERATE DATA OF TVL PATH INSIDE INTXN

APPARATUS FOR GENERATING DATA OF TRAVEL PATH INSIDE INTERSECTION, PROGRAM FOR GENERATING DATA OF TRAVEL PATH INSIDE INTERSECTION, AND STORAGE MEDIUM

CROSS-REFERENCE OF RELATED APPLICATIONS

This application is a continuation application of PCT/JP2018/035384 filed on Sep. 25, 2018, which designated the U.S. and claims the benefit of priority from Japanese Patent Application No. 2017-236875 filed on Dec. 11, 2017. The entire disclosures of all of the above applications are incorporated herein by reference.

TECHNICAL FIELD

The present disclosure relates to an apparatus for generating data of travel paths inside intersections, a program for generating data of travel paths inside intersections, and storage medium

BACKGROUND

There is a method of highly accurately measuring shape and position of a road by using dedicated vehicles and generating lane network data for automated driving.

SUMMARY

The present disclosure provides an apparatus for generating data of travel paths inside intersections, program for generating data of travel paths inside intersections, and storage medium that can eliminate the needs to visit local sites and that can generate data of travel paths inside intersections for automated driving that less degrades an occupant comfort at a time of passage of the intersection.

In an aspect of the present disclosure, an apparatus generates intersection feature data representing features of intersections, by using data of travel paths outside intersections. The apparatus associates the intersection feature data with motion trajectory data showing actual motion trajectories of vehicles inside intersections and generates sample data serving as samples of association between the feature of the intersection and travel paths inside the intersection. The apparatus searches the sample data for the sample that corresponds to specific intersection feature data representing a feature of a given intersection; specifies the motion trajectory data associated with the specific intersection feature data; and provides the specified motion trajectory data as data of travel paths inside intersections that correspond to the given intersection.

In an aspect of the present disclosure, an apparatus generates intersection feature data representing features of intersections, by using data of travel paths outside the intersections. The apparatus associates the intersection feature data with motion trajectory data showing actual motion trajectories of vehicles inside intersections, and teaches the motion trajectory data associated with the intersection feature data to an inference program. The apparatus executes the inference program to lean travel path data that matches the intersection feature data associated with the motion trajectory data showing the actual motion trajectories inside the intersections. The apparatus inputs intersection feature data representing a feature of a given intersection to the inference program; specifies travel path data that matches the input intersection feature data; and provides the specified travel path data as data of travel paths inside intersections that correspond to the given intersection.

BRIEF DESCRIPTION OF THE DRAWINGS

Objects, features and advantages of the present disclosure will become more apparent from the following detailed description made with reference to the accompanying drawings. In the drawings.

DETAILED DESCRIPTION

A method of highly accurately measuring shape and position of a road by using dedicated vehicles and generating lane network data for automated driving is a high cost method because it in principle requires a huge amount of work using expensive sensors and man powers. Therefore, lane network data is generated only in a limited area such as a highway or a motorway. Generating lane network data nationwide including local roads using the above-mentioned method is not realistic.

In this regard, for example, there is a first method of generating travel path data without using the dedicated moving vehicles. This first method includes collecting front images captured by cameras mounted on non-dedicated vehicles. Further, for example, there is a second method of generating inside-intersection travel path data. In this second method, inside-intersection travel path data is not prepared in advance. Only needed, the inside-intersection travel path data is prepared via connecting enter lanes and exit lanes by arcs (secondary Bezier curve), wherein the enter lanes are lanes from which the intersection is entered, and the exit lanes are lanes to which the intersection is exited.

The first method may make it possible to extend a lane network data generation range. However, the first method is the same as the method that uses the dedicated moving vehicles, in that it is necessary to visit local sites to photograph road conditions. It is therefore impossible to solve the problem of high cost, and there is such a problem that it impossible to generate lane network data of roads that have not been visited. Further, the second method may make it possible to eliminate needs to visit the sites. However, since trajectories at actual traveling of vehicles inside intersections vary depending on intersection shape, the travel path data generated by the above-described method may highly likely deviate from the trajectories at actual travelling. Therefore, there is such a problem that an occupant may have less comfort at a time of passage of the intersection due to the deviation of the travel path data from the actual motion trajectories.

It is an object of the present disclosure to provide an apparatus for generating data of travel paths inside intersections, a program for generating data of travel paths inside intersections, and a storage medium that can eliminate the needs to visit local sites and that can generate data of travel paths inside intersections for automated driving that less degrades an occupant comfort at a time of passage of the intersection.

In an example of the present disclosure, an intersection feature data generator generates intersection feature data representing features of intersections, by using data of travel paths outside intersections. The sample data generator associates the intersection feature data with motion trajectory data showing actual motion trajectories of vehicles inside intersections and generates sample data serving as samples of association between the feature of the intersection and travel paths inside the intersection. The travel path data generator: searches the sample data for the sample that corresponds to specific intersection feature data representing a feature of a given intersection; specifies the motion trajectory data associated with the specific intersection feature data; and provides the specified motion trajectory data as data of travel paths inside intersections that correspond to the given intersection.

In the above, the sample data serving as samples of association between the feature of the intersection and travel paths inside the intersection is generated, and the search for the sample data that corresponds to specific intersection feature data representing a feature of a given intersection is made. Then, the motion trajectory data associated with the specific intersection feature data is specified and the specified data is provided as generated data of travel paths inside intersections that corresponds the given intersection. By generating the sample data, it is possible to generate the data of travel paths inside a certain intersection wherein the certain intersection is an intersection for which the motion trajectory data showing an actual trajectory of a vehicle is absent. As a result, without having to visit the sites, it is possible to appropriately generate the data of travel paths inside intersections for automated driving that does not impair the comfort given to the occupant at intersection passage.

In another example of the present disclosure, an intersection feature data generator generates intersection feature data representing features of intersections, by using data of travel paths outside the intersections. A motion trajectory data teacher associates the intersection feature data with motion trajectory data showing actual motion trajectories of vehicles inside intersections, and teaches the motion trajectory data associated with the intersection feature data to an inference program. An inference program executer executes the inference program to lean travel path data that matches the intersection feature data associated with the motion trajectory data showing the actual motion trajectories inside the intersections. A travel path data generator: inputs intersection feature data representing a feature of a given intersection to the inference program; specifies travel path data that matches the input intersection feature data; and provides the specified travel path data as data of travel paths inside intersections that correspond to the given intersection.

In the above, the motion trajectory data associated with the intersection feature data is taught to the inference program to learn the travel path data that matches the intersection feature data associated with the motion trajectory data inside the intersections. Thereafter, the intersection feature data representing a feature of a given intersection is input to the inference program, so that the travel path data matching the input intersection feature data is specified and is provided as generated data of travel paths inside intersections that corresponds to the given intersection. By executing the inference program and learning the travel path data that matches the intersection feature data, it is possible to generate data of travel paths inside a particular intersection wherein the particular intersection is an intersection for which there is no motion trajectory data. As a result, without having to visit the sites, it is possible to appropriately generate the data of travel paths inside intersections for automated driving that does not impair the comfort given to the occupant at intersection passage.

First Embodiment

Figure 1:
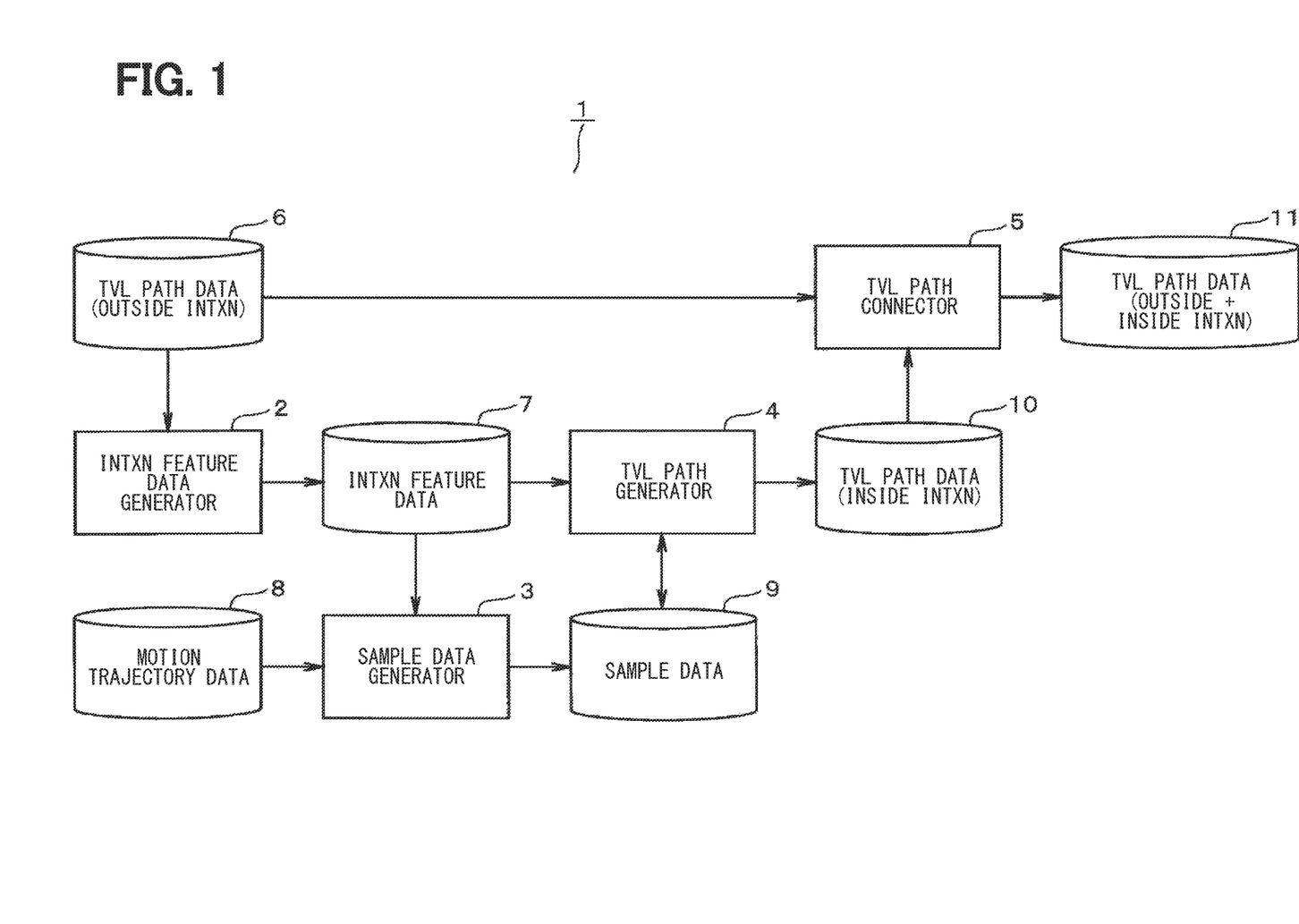
FIG. 1 is a functional block diagram illustrating a first embodiment.

A first embodiment will be described with reference to FIGS. 1 to 7. As shown in FIG. 1, a travel path data generation apparatus 1 for generating data of travel paths inside intersections for automated driving includes an intersection feature data generator 2, a sample data generator 3, a travel path data generator 4 and a travel path data connector 5. These functional blocks are implemented by a microcomputer including a CPU (Central Processing Unit), a ROM (Read Only Memory), a RAM (Random Access Memory), and an I/O (Input/Output). The microcomputer executes a computer program stored in a non-transitory tangible storage medium, thereby performing processing corresponding to the computer program, and controlling overall operation of the travel path data generation apparatus 1. The computer program executed by the microcomputer includes a travel path data generation program.

A travel path data storage 6 has thereon stored data of travel paths outside intersections for automated driving. The intersection feature data generator 2 reads the data of travel paths outside intersections stored in the travel path data storage 6, and generates intersection feature data representing features of the intersections by using the data of travel paths outside the intersections. The intersection feature data includes at least type of road (lane) connected to the intersection, its position, its enter angle, its exit angle, connection information regarding connection between connected roads, regulation information, and the like. After generating the intersection feature data, the intersection feature data generator 2 stores the generated intersection feature data in an intersection feature data storage 7.

A motion trajectory data storage 8 has thereon stored motion trajectory data showing motion trajectories on which vehicles actually traveled inside intersections. The sample data generator 3 reads the intersection feature data stored in the intersection feature data storage 7 and reads the motion trajectory data stored in the motion trajectory data storage 8. The sample data generator 3 associates the read intersection feature data with the motion trajectory data of the actual vehicle trajectories inside the intersections and generates sample data serving as samples of association between a feature of an intersection and travel paths inside the intersection. In response to generating the sample data, the sample data generator 3 stores the generated sample data in a sample data storage 9.

The travel path data generator 4 reads the intersection feature data stored in the intersection feature data storage 7 and the sample data stored in the sample data storage 9, and searches for the sample data that corresponds to specific intersection feature data representing a feature of a given intersection. Then the travel path data generator 4 specifies the motion trajectory data associated with the specific intersection feature data, and generates the data of travel paths inside the intersections that correspond to the given intersection, such that the specified motion trajectory data is used as the data of travel paths inside the intersections that correspond to the given intersection. In response to generating the data of travel paths inside the intersections, the travel path data generator 4 stores the generated inside-intersection travel path data in a travel path data storage 10.

The travel path data connector 5 reads the data of travel paths outside the intersections stored in the travel path data storage 6 and the data of travel paths inside the intersections stored in the travel path data storage 10, and connects the read data of travel paths outside the intersections and the read data of travel paths inside the intersections. In response to connecting the outside-intersection travel path data and the inside-intersection travel path data, the travel path data connector 5 stores the connected travel path data in a travel path data storage 11 as travel path data for an entire area.

Next, operation of the above configuration will be described with reference to FIGS. 2 to 7. The travel path data generation apparatus 1 starts travel path data generation processing in response to a start condition of the travel path data generation processing being met. Processing executed by a respective functional block in the travel path data generation apparatus 1 will be described below.

Figure 3:
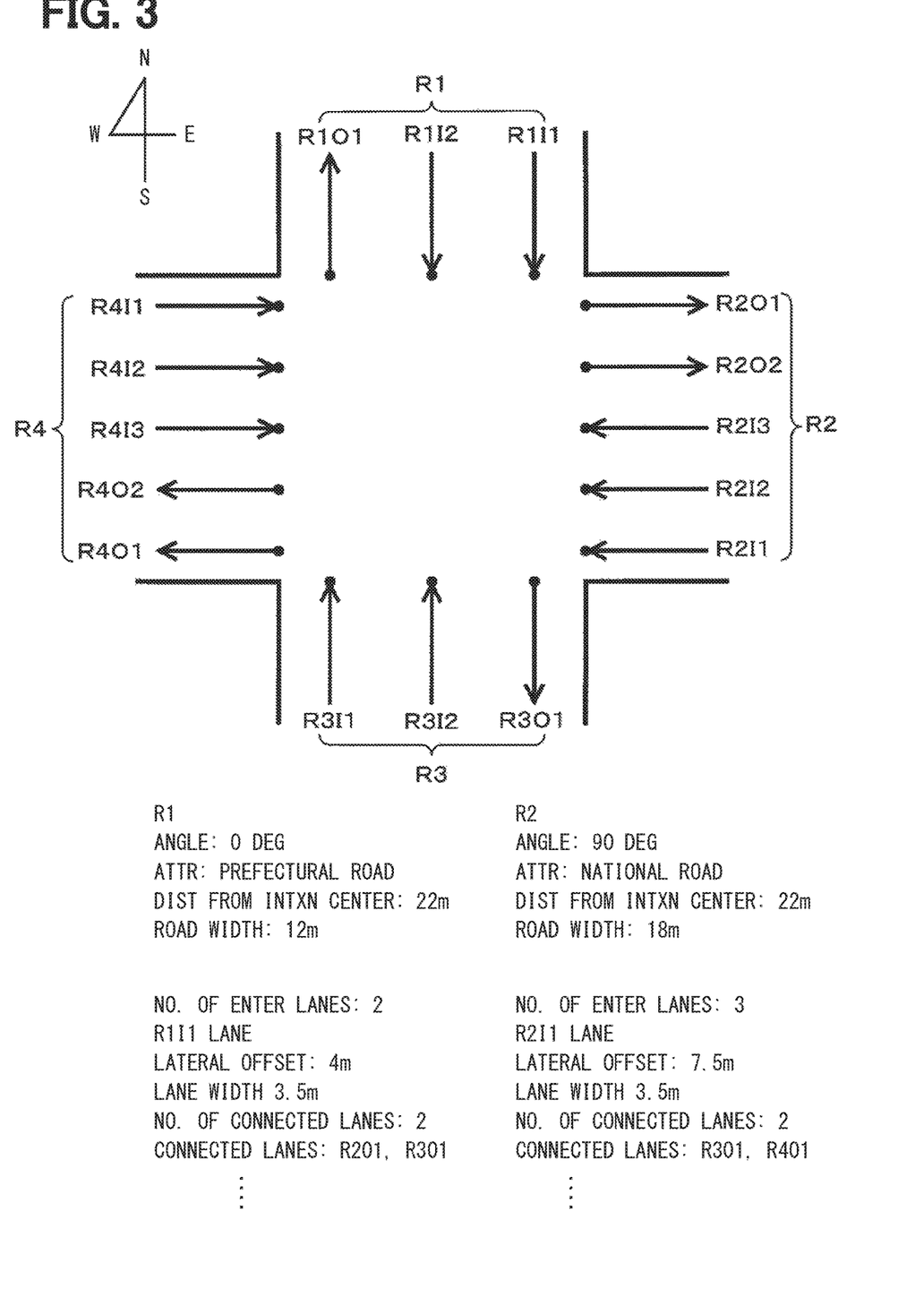
FIG. 3 is a diagram illustrating intersection feature data.

The intersection feature data generator 2 uses the outside-intersection travel path data to generate intersection feature data representing a feature of an intersection as illustrated in FIG. 3 (S1, corresponding to an intersection feature data generation procedure). In FIG. 3, for example, a road connected to the north side of the intersection is such that an attribute is "prefectural road", a distance from the center of the intersection is "22 meters", a road width is "12 meters", and the number of enter lanes is "2" and the number of exit lanes is 1. In response to generating the intersection feature data, the intersection feature data generator 2 stores the generated intersection feature data in the intersection feature data storage 7.

Figure 4:
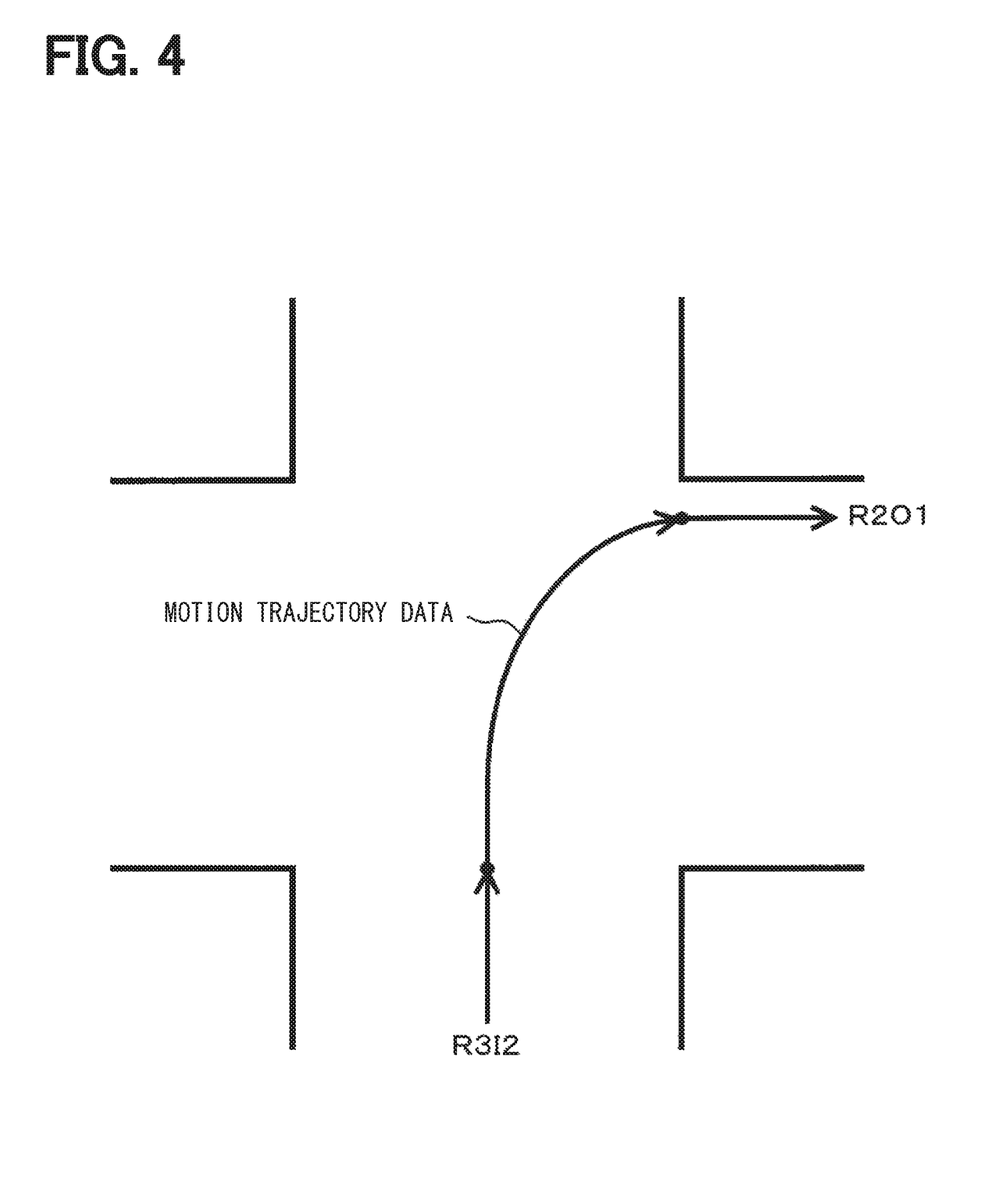
FIG. 4 is a diagram illustrating motion trajectory data.
Figure 5:
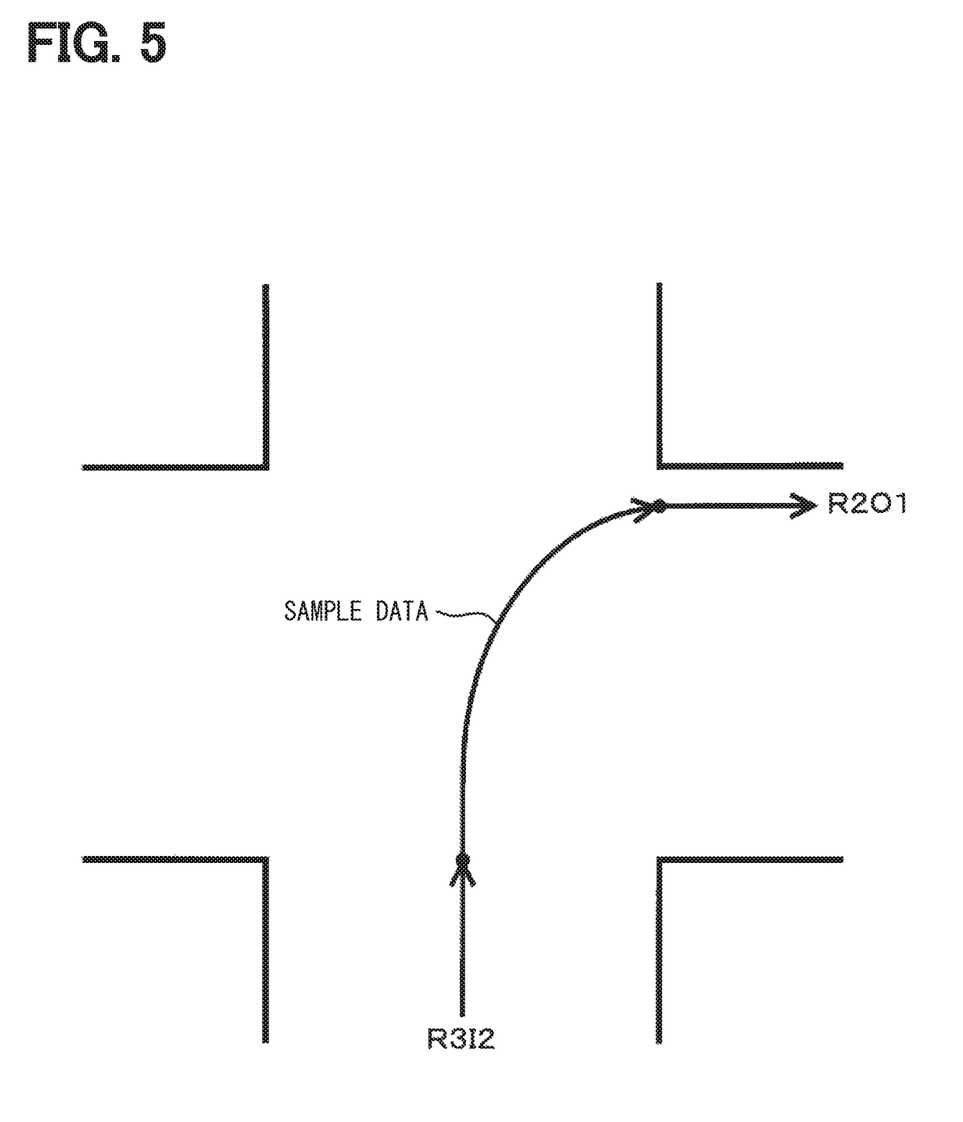
FIG. 5 is a diagram illustrating sample data (No. 1)

Next, the sample data generator 3 reads the intersection feature data stored in the intersection feature data storage 7 and the motion trajectory data stored in the motion trajectory data storage 8. The sample data generator 3 associates the read intersection feature data with the motion trajectory data showing the trajectories of the vehicles that actually traveled in the intersection, and generates the sample data of samples of association between the feature of the intersection and the travel paths inside the intersection (S2, which corresponds to a sample data generation procedure). Specifically, as illustrated in FIG. 4, in response to reading motion trajectory data showing a trajectory passing through the enter lane of the outside-intersection travel path data "R3I2" and the exit lane of the outside-intersection travel path data "R201", the sample data generator 3 generates sample data characterized by the enter lane of the outside-intersection travel path data "R3I2" and the exit lane of the outside-intersection travel path data "R201".

Figure 6:
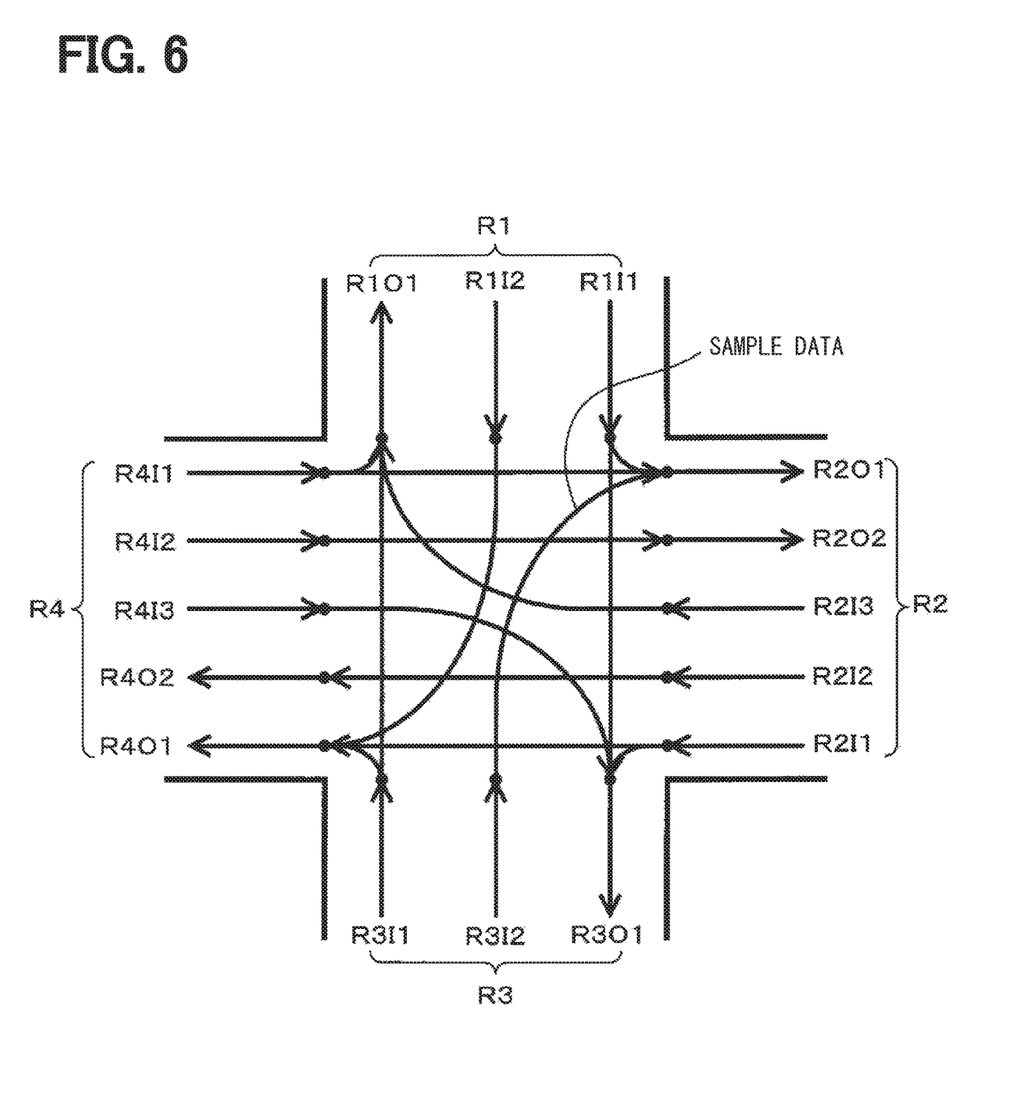
FIG. 6 is a diagram illustrating sample data (No. 2)

In this regard, it is impossible for the sample data generator 3 to generate sample data for a combination of an enter lane and an exit lane for which there is no motion trajectory data, whereas it is possible for the sample data generator 3 to generate the sample data for a combination of an enter lane and an exit lane for which there is motion trajectory data. Specifically, when there are the motion trajectory data for all of the combinations of the enter lane and the exit lane that are permitted to be travelled according to Road Traffic Law with regard to the intersection feature data illustrated in FIG. 3, the sample data generator 3 generates the sample data for all of the combinations of the enter lane and the exit lane, as illustrated in FIG. 6. It is noted that in cases where motion trajectory data is completely absent for certain intersection feature data, the sample data generator 3 cannot associate the certain intersection feature data with motion trajectory data and accordingly cannot generate the sample data for the certain intersection.

Figure 7:
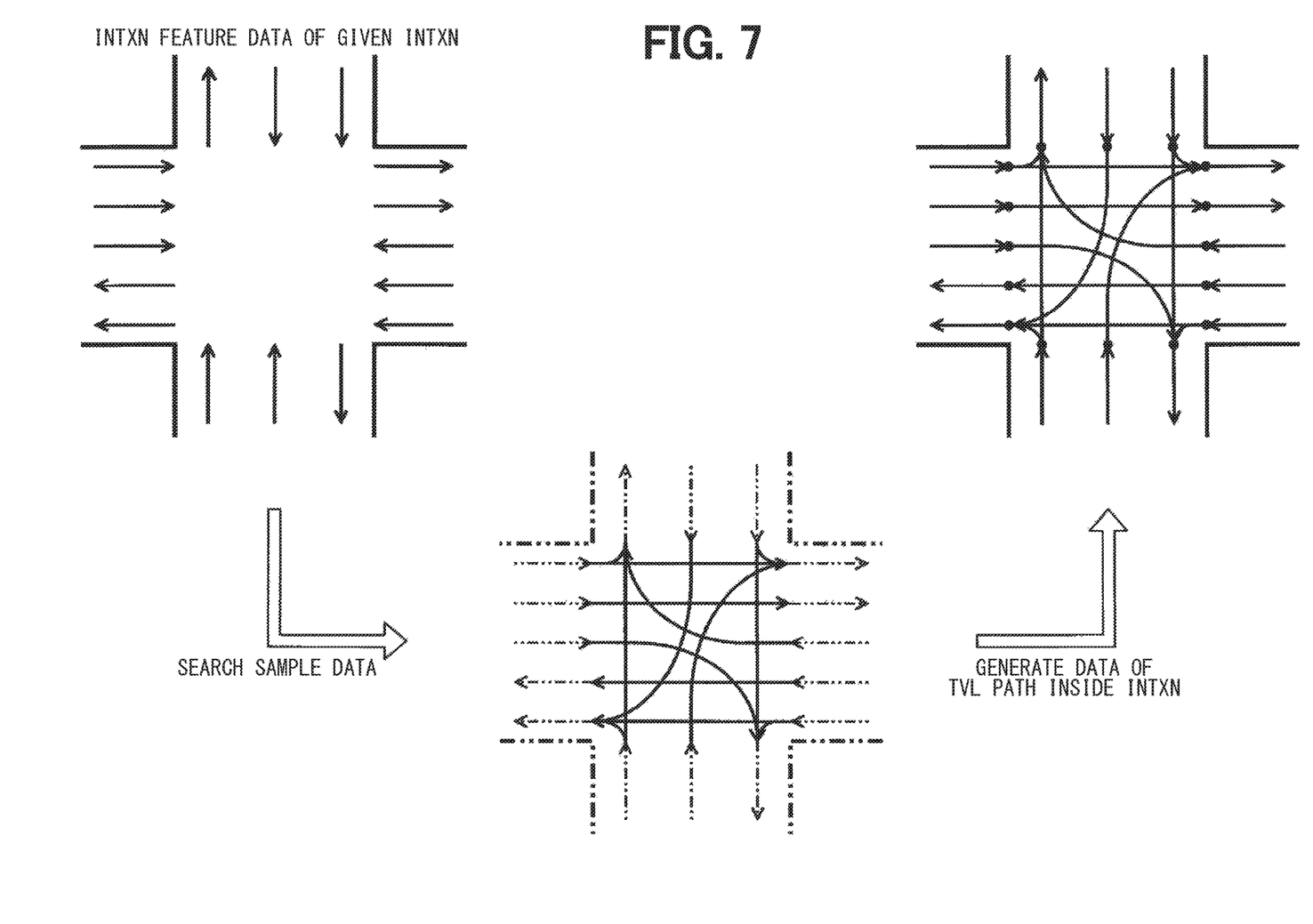
FIG. 7 is a diagram illustrating search of sample data and generation of data of travel paths inside an intersection.

Next, the travel path data generator 4 reads the intersection feature data stored in the intersection feature data storage 7 and the sample data stored in the sample data storage 9, and searches for the sample data that corresponds to specific intersection feature data representing a feature of a given intersection as shown in FIG. 7. The travel path data generator 4 specifies the travel trajectory data that is associated with the specific intersection feature data, and the travel path data generator 4 provides the travel trajectory data as data of travel paths inside an intersection that correspond to the given intersection. In response to generating the data of travel paths inside the intersection, the travel path data generator 4 stores the generated data in the travel path data storage 10.

Specifically, the travel path data generator 4 makes a search for the sample data that corresponds to the intersection feature data representing similar features from among the intersection feature data individually generated for the respective intersections in the whole country. The motion trajectory data obtained as the result of the search is provided as the data of travel paths inside the intersections having the similar features. In searching for the intersection feature data representing the similar features, the travel path data generator 4 may determine a degree of similarity according to intersection feature as a whole, or may determine the degree of similarity based on such limited information as information on the lanes entering to the intersection, the lane exiting from the intersection, information on another road affecting the travel path, and the like. With regard to angles of the enter lane, the exit lane and the like, the travel path data generator 4 may use relative angles to determine the degree of similarity without considering absolute angle differences.

Figure 2:
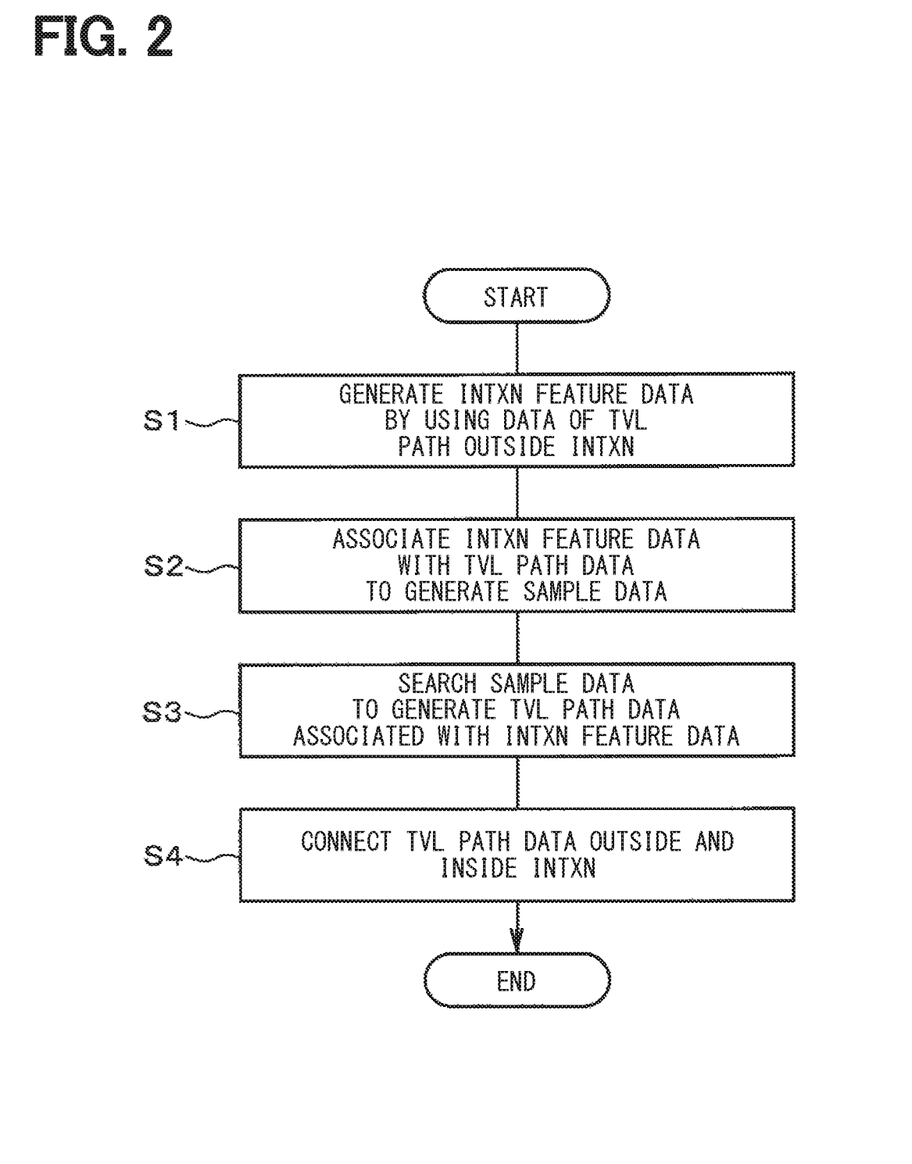
FIG. 2 is a flow chart.

Next, the travel path data connector 5 reads the data of travel paths outside the intersection stored in the travel path data storage 6 and also reads the data of travel paths inside the intersection stored in the travel path data storage 10. The travel path data connector 5 connects the read data of travel paths outside the intersection and the read data of travel paths inside the intersection (S4, which corresponds to a travel path data connection procedure). In response to connecting the data of travel paths outside the intersection and the data of travel paths inside the intersection, the travel path data connector 5 stores in the travel path data storage 11 the connected travel path data as the data of travel paths for passage of the intersection, specifically, as travel path data defining a continuous travel path from enter into the intersection to exit from the intersection, and then the travel path data generation processing is ended.

The first embodiment as described above can provide the following operational technical effects. The apparatus for generating data of travel path inside intersections is configured to generate sample data serving as samples of association between a feature of an intersection and travel paths inside the intersection and searches for the sample data that corresponds to specific intersection data representing a feature of a given intersection. The apparatus is further configured to specify the motion trajectory data associated with the specific intersection feature data to generate the data of travel paths inside the intersections that corresponds to the given intersection. By generating the sample data, it is possible to generate the data of travel paths inside certain intersections wherein the certain intersections are intersections for which the motion trajectory data showing the trajectories on which the vehicles actually travelled are absent. As a result, without having to visit the sites, it is possible to appropriately generate the data of travel paths inside intersections for automated driving that does not impair the comfort given to the occupants when passing through the intersection, In addition, the data of travel paths outside the intersection and the data of travel paths inside the intersection generated in the above way are connected. It is possible to appropriately generate data of continuous travel paths from the enter to the intersection to the exit from the intersection.

Second Embodiment

Next, a second embodiment will be described with reference to FIGS. 8 to 10. Explanation on the same portions as those in the first embodiment will be omitted, and different portions will be described. The second embodiment is configured to execute an inference program and learn travel path data that matches the intersection feature data associated with the data of motion trajectory inside the intersection.

Figure 8:
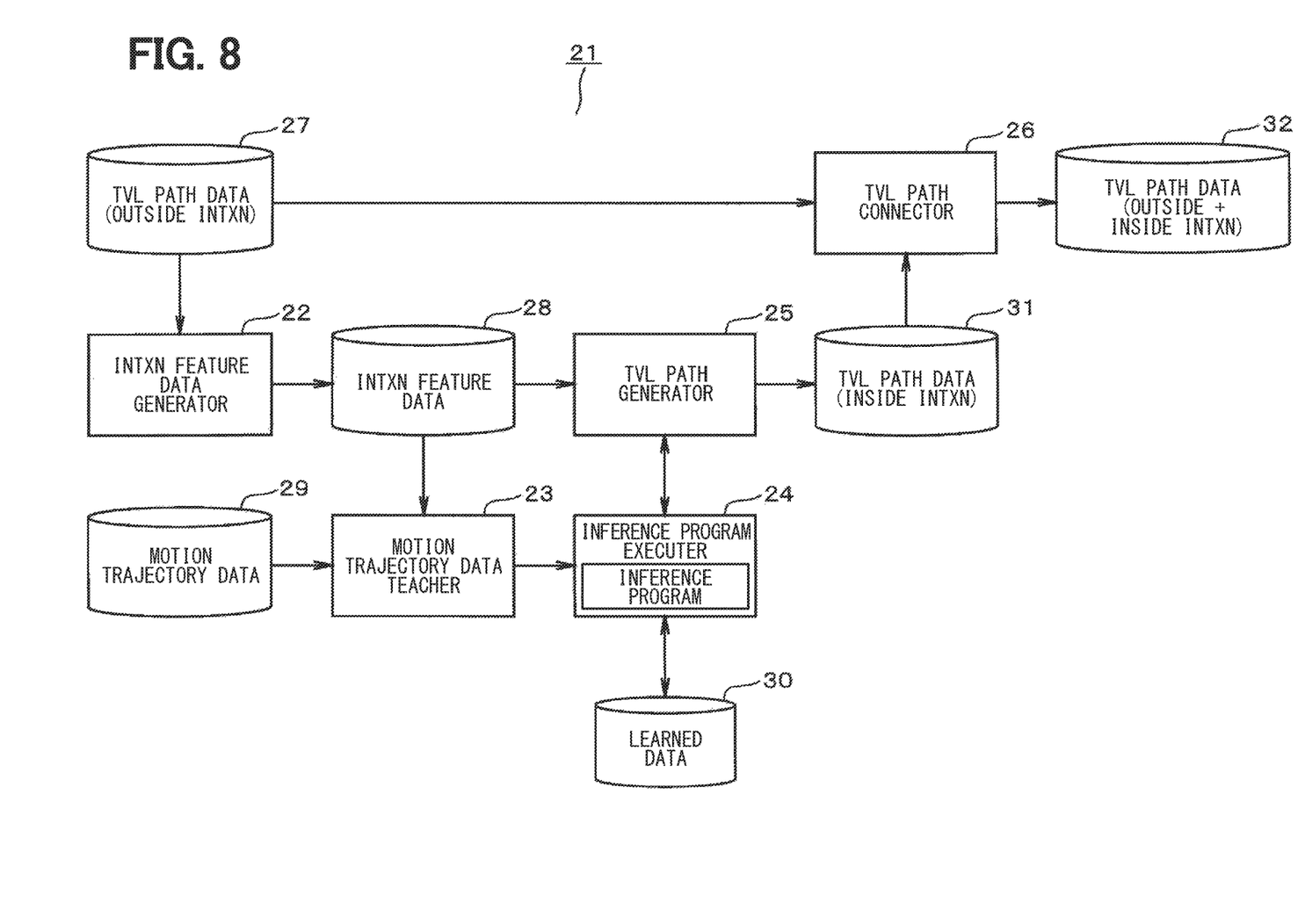
FIG. 8 is a functional block diagram illustrating a second embodiment.
Figure 9:
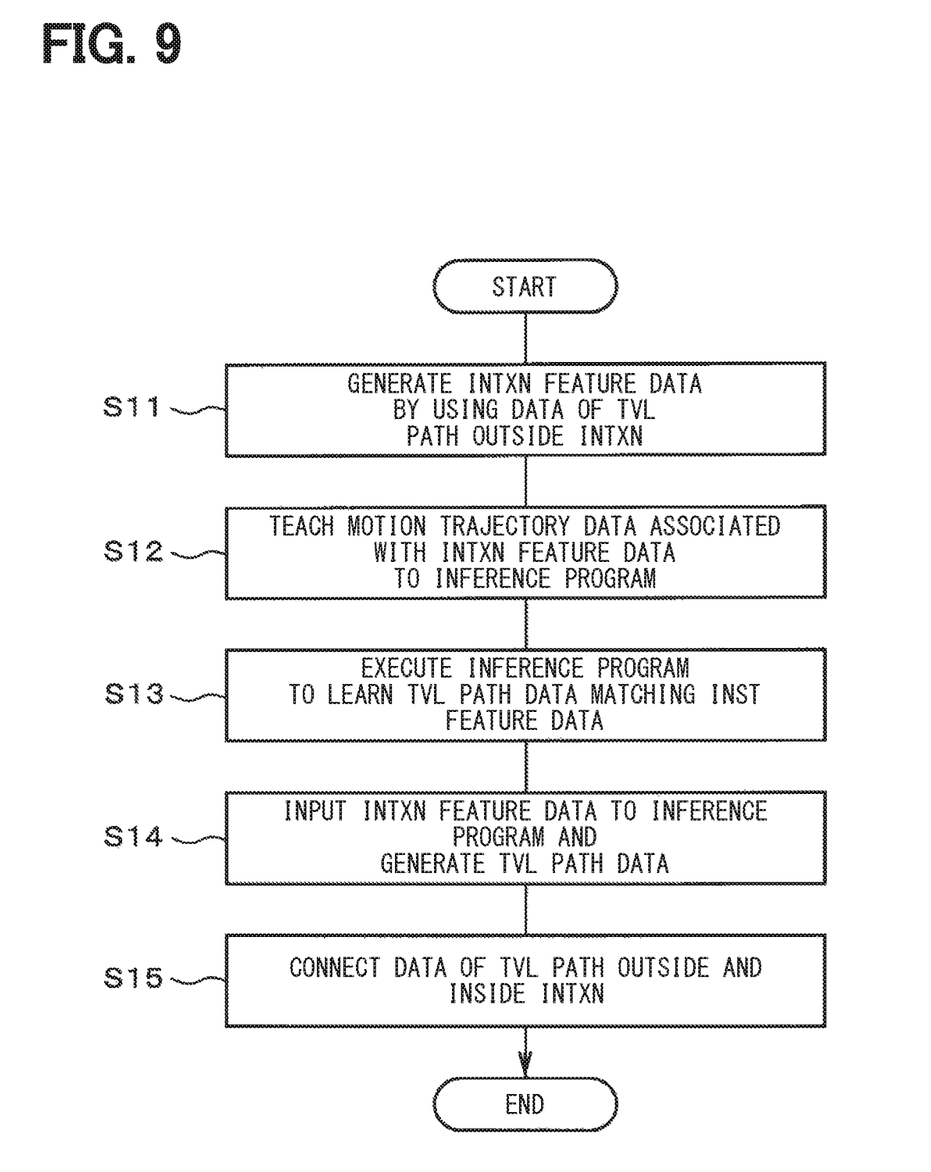
FIG. 9 is a flow chart.

As shown in FIG. 8, a travel path data generation apparatus 21 includes an intersection feature data generator 22, a travel path data teacher 23, an inference program executer 24, a travel path data generator 25, and travel path data connector 26. These functional blocks are also implemented by a microcomputer comprising a CPU, ROM, RAM and I/O.

The intersection feature data generator 22 is the same as the intersection feature data generator 2 described in the first embodiment, and reads the outside-intersection travel path data stored in a travel path data storage 27 and generates the intersection feature data representing features of intersections by using the read outside-intersection travel path data. The intersection feature data generator 22 stores the generated intersection feature data in an intersection feature data storage 28.

The motion trajectory data teacher 23 reads the intersection feature data stored in the intersection feature data storage 28 and the motion trajectory data stored in a motion trajectory data storage 29. The motion trajectory data teacher 23 associates the read intersection feature data with the motion trajectory data showing trajectories on which vehicles actually travelled in the intersections. The motion trajectory data teacher 23 teaches the motion trajectory data associated with the intersection feature data to the inference program.

The inference program executer 24 executes the inference program, learns the travel path data that matches the intersection feature data associated with the data of motion trajectory inside the intersections, and stores the learned data in a learned data storage 30.

The travel path data generator 25 inputs intersection feature data representing a feature of a given intersection to the inference program, specifies the travel path data that matches the input intersection feature data, and provides the identified data as the data of travel paths inside intersections that corresponds to the given intersection. In response to obtaining the data of travel paths inside the intersections, the travel path data generator 25 stores the obtained data in a travel path data storage 31.

The travel path data connector 26 is similar to the travel path data connector 5 described in the first embodiment, and reads the outside-intersection travel path data stored in the travel path data storage 27 and the inside-intersection travel path data stored in the data storage 31, and connects the read outside-intersection travel path data and the read inside-intersection travel path data. In response to connecting the outside-intersection travel path data and the inside-intersection travel path data, the travel path data connector 26 stores the connected travel path data in a travel path data storage 32 as travel path data for an entire area.

Next, the operation of the above configuration will be described with reference to FIGS. 9 and 10.

The travel path data generation apparatus 21 starts travel path data generation processing in response to a start event of the travel path data generation processing being met. Hereinafter, processing executed by a respective functional block in the travel path data generation apparatus 21 will be described.

First, the intersection feature data generator 22 generates the intersection feature data representing features of intersections by using the data of travel paths outside the intersections (S11, which corresponds to an intersection feature data generation procedure). In response to generating the intersection feature data, the intersection feature data generator 22 stores the generated intersection feature data in the intersection feature data storage 28. The intersection feature data generator 22 generates the intersection feature data for all of the intersections targeted for generation of the data of travel paths inside intersections.

Next, the motion trajectory data teacher 23 reads the intersection feature data stored in the intersection feature data storage 28 and the motion trajectory data stored in the motion trajectory data storage 29. The motion trajectory data teacher 23 associates the read intersection feature data with the motion trajectory data showing the trajectories on which vehicles actually traveled inside intersections. The motion trajectory data teacher 23 teaches the motion trajectory data associated with the intersection feature data to the inference program executed by the inference program executer 24 (S12, which corresponds to a motion trajectory data teaching procedure).

Next, the inference program executer 24 executes the inference program, learns the travel path data that matches the intersection feature data associated with the data of trajectories inside intersections, and stores the learned data in the learned data storage 30 (S13, corresponding to an inference program execution procedure in S13).

Figure 10:
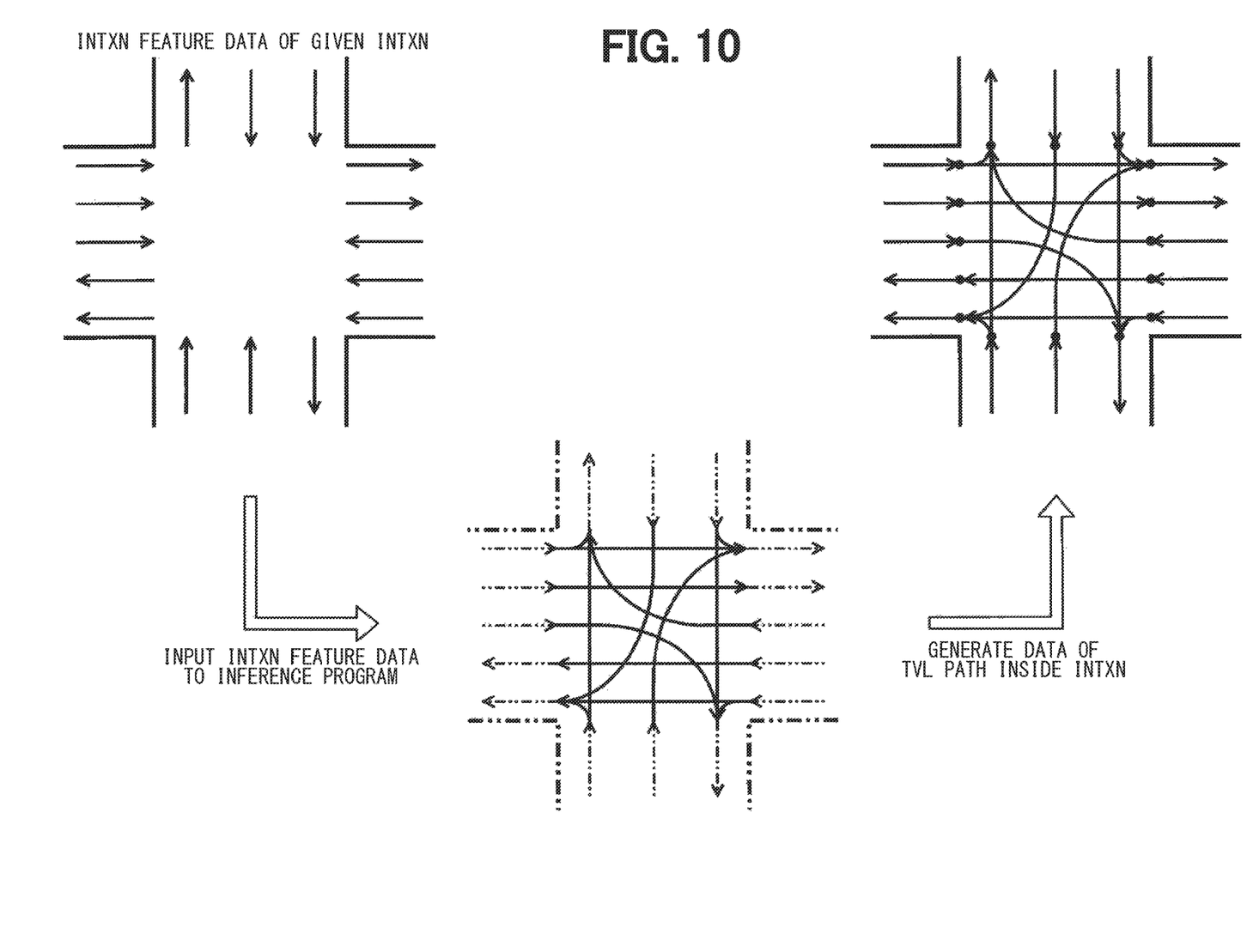
FIG. 10 is a diagram illustrating execution of an inference program and generation of data of travel paths inside an intersection.

Next, the travel path data generator 25 inputs intersection feature data representing a feature of a given intersection to the inference program, and as illustrated in FIG. 10, specifies the travel path data that matches the input intersection feature data, and provides the specified travel path data as data of travel paths in intersections that corresponds to the given intersection (S14, which corresponds to a travel path data generation procedure). In response to generating the data of travel paths inside the intersections, the travel path data generator 25 stores the generated inside-intersection travel path data in the travel path data storage 31.

Next, the travel path data connector 26 reads the outside-intersection travel path data stored in the travel path data storage 27, and at the same time, reads the inside-intersection travel path data stored in the travel path data storage 31. The travel path data connector 26 connects the read outside-intersection travel path data and the read inside-intersection travel path data (S15, which corresponds to a travel path data integration procedure). In response to connecting the outside-intersection travel path data and the inside-intersection travel path data, the traveling path data connector 26 stores the connected travel path data in the travel path data storage 11 as data of travel paths for intersection passage, specifically as the travel path data defining continuous travel paths from enter to the intersection to exit from the intersection.

The second embodiment as described above provides the following operational technical effects. The second embodiment teaches the motion trajectory data associated with the intersection feature data to the inference program, so that the travel path data that matches the intersection feature data associated with the inside-intersection motion trajectory data is leaned. Thereafter, the second embodiment inputs the intersection feature data representing a feature of a given intersection to the inference program, so that the travel path data matching the input intersection feature data is specified and the data of travel paths inside an intersection that corresponds to the given intersection is generated. By executing the inference program and learning the travel path data that matches the intersection feature data, it is possible to provide the same operational technical effects as in the first embodiment.

It is noted that the absence of the intersection feature data having a similar feature makes it impossible to generate the data of travel paths inside the intersection. However, the second embodiment can generate the data of travel paths inside an intersection even in the absence of the intersection feature data having a similar feature Other Embodiments Although the present disclosure has been described with reference to embodiments, it is to be understood that the present disclosure is not limited to those embodiments and structures. The present disclosure also encompasses various modifications and variations within an equivalent range. In addition, various combinations and forms, and other combinations and forms, including only one, more, or less element, are also within the scope and spirit of the present disclosure.

In the travel path data generation apparatus 1, each functional block may be distributed. That is, for example, some of the functional blocks may be provided in a server separate from the travel path data generation apparatus 1, and various data may be transmitted and received via a communication line to generate travel path data.

What is claimed is:

1. A travel path data generation apparatus for generating data of travel paths inside intersections for automated driving, comprising a computer including a memory and a processor configured to:
   by using data of travel paths outside intersections, generate intersection feature data representing features of the intersections;
   associate the intersection feature data with motion trajectory data showing actual motion trajectories of vehicles inside intersections, and generates sample data serving as samples of association between the feature of the intersection and travel paths inside the intersection; and
   search the sample data for a sample that corresponds to specific intersection feature data representing a feature of a given intersection that has no motion trajectory data showing trajectories on which vehicles actually travelled in the given intersection, specify the motion trajectory data associated with the specific intersection feature data, provide the specified motion trajectory data as data of travel paths inside intersections that correspond to the given intersection, and generate the data of travel paths inside the given intersection by searching the sample data corresponding to the given intersection;
   wherein:
   the data of travel paths inside intersections is provided to correspond to the intersection feature data including: a type of a road and a lane connected to the intersection; intersection position; intersection enter angle; intersection exit angle; connection information regarding connection between connected roads; and regulation information;
   the intersection position indicates a positional relation between the intersection and the road or the lane connected to the intersection;
   the positional relation between the intersection and the road or the lane connected to the intersection indicates a relative angle of a connection position between the intersection and the road or the lane when viewed from the intersection.

2. The travel path data generation apparatus according to claim 1, wherein
   the computer connects the data of travel paths outside the intersection and the data of travel paths inside the intersection.

3. A travel path data generation apparatus for generating data of travel paths inside intersections for automated driving, comprising a computer including a memory and a processor configured to:
   by using data of travel paths outside intersections, generate intersection feature data representing features of the intersections;
   associate the intersection feature data with motion trajectory data showing actual motion trajectories of vehicles inside intersections, and teaches the motion trajectory data associated with the intersection feature data to an inference program;
   execute the inference program to learn travel path data that matches the intersection feature data associated with the motion trajectory data showing the actual motion trajectories inside the intersections and to generate sample data serving as samples of association between the features of the intersection and travel paths inside the intersection; and
   input intersection feature data representing a feature of a given intersection that has no motion trajectory data showing trajectories on which vehicles actually travelled in the given intersection to the inference program, specify travel path data that matches the input intersection feature data, provide the specified travel path data as data of travel paths inside intersections that correspond to the given intersection, and generate the data of travel paths inside the given intersection by searching the sample data corresponding to the given intersection;
   wherein:
   the data of travel paths inside intersections is provided to correspond to the intersection feature data including at least one of: a type of a road and a lane connected to the intersection; intersection position; intersection enter angle; intersection exit angle; connection information regarding connection between connected roads; and regulation information;
   the intersection position indicates a positional relation between the intersection and the road or the lane connected to the intersection;

the positional relation between the intersection and the road or the lane connected to the intersection indicates a relative angle of a connection position between the intersection and the road or the lane when viewed from the intersection.

4. The travel path data generation apparatus according to claim 3, wherein
the computer connects the data of travel paths outside the intersection and the data of travel paths inside the intersection.

5. A computer readable non-transitory storage medium storing a program for generating data of travel paths inside intersections for automated driving, the program causing a travel path data generation apparatus to execute:
by using data of travel paths outside intersections, generating intersection feature data representing features of the intersections;
associating the intersection feature data with motion trajectory data showing actual motion trajectories of vehicles inside intersections; and generating sample data serving as samples of association between the feature of the intersection and travel paths inside the intersection;
searching the sample data for a sample that corresponds to specific intersection feature data representing a feature of a given intersection that has no motion trajectory data showing trajectories on which vehicles actually travelled in the given intersection;
specifying the motion trajectory data associated with the specific intersection feature data;
providing the specified motion trajectory data as data of travel paths inside intersections that correspond to the given intersection; and
generating the data of travel paths inside the given intersection by searching the sample data corresponding to the given intersection;
wherein:
the data of travel paths inside intersections is provided to correspond to the intersection feature data including at least one of: a type of a road and a lane connected to the intersection; intersection position; intersection enter angle; intersection exit angle; connection information regarding connection between connected roads; and regulation information;
the intersection position indicates a positional relation between the intersection and the road or the lane connected to the intersection;
the positional relation between the intersection and the road or the lane connected to the intersection indicates a relative angle of a connection position between the intersection and the road or the lane when viewed from the intersection.

6. A computer readable non-transitory storage medium storing a program for generating data of travel paths inside intersections for automated driving, the program causing a travel path data generation apparatus to execute:
by using data of travel paths outside intersections, generating intersection feature data representing features of the intersections;
associating the intersection feature data with motion trajectory data showing actual motion trajectories of vehicles inside intersections; and teaching the motion trajectory data associated with the intersection feature data to an inference program;
executing the inference program to learn travel path data that matches the intersection feature data associated with the motion trajectory data showing the actual motion trajectories inside the intersections and generating sample data serving as samples of association between the features of the intersection and travel paths inside the intersection; and
inputting intersection feature data representing a feature of a given intersection that has no motion trajectory data showing trajectories on which vehicles actually travelled in the given intersection to the inference program; specifying travel path data that matches the input intersection feature data; providing the specified travel path data as generating data of travel paths inside intersections that correspond to the given intersection; and generating the data of travel paths inside the given intersection by searching the sample data corresponding to the given intersection;
wherein:
the data of travel paths inside intersections is provided to correspond to the intersection feature data including at least one of: a type of a road and a lane connected to the intersection; intersection position; intersection enter angle; intersection exit angle; connection information regarding connection between connected roads; and regulation information;
the intersection position indicates a positional relation between the intersection and the road or the lane connected to the intersection;
the positional relation between the intersection and the road or the lane connected to the intersection indicates a relative angle of a connection position between the intersection and the road or the lane when viewed from the intersection.

* * * * *